(12) United States Patent
Hicks

(10) Patent No.: US 11,330,247 B2
(45) Date of Patent: *May 10, 2022

(54) DYNAMIC VISION SENSOR AND PROJECTOR FOR DEPTH IMAGING

(71) Applicant: Sony Group Corporation, Tokyo (JP)

(72) Inventor: Richmond Hicks, Aloha, OR (US)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,443

(22) Filed: Apr. 2, 2021

(65) Prior Publication Data

US 2021/0227194 A1 Jul. 22, 2021

Related U.S. Application Data

(63) Continuation of application No. 16/698,849, filed on Nov. 27, 2019, now Pat. No. 10,992,923, which is a continuation of application No. 15/847,676, filed on Dec. 19, 2017, now Pat. No. 10,516,876.

(51) Int. Cl.
| | |
|---|---|
| *H04N 13/271* | (2018.01) |
| *G01B 11/25* | (2006.01) |
| *G03B 17/54* | (2021.01) |
| *G03B 21/00* | (2006.01) |
| *G06T 7/50* | (2017.01) |
| *G06T 7/521* | (2017.01) |
| *H04N 5/232* | (2006.01) |
| *H04N 5/235* | (2006.01) |
| *H04N 13/00* | (2018.01) |

(52) U.S. Cl.
CPC ....... *H04N 13/271* (2018.05); *G01B 11/2513* (2013.01); *G01B 11/2545* (2013.01); *G03B 17/54* (2013.01); *G03B 21/008* (2013.01); *G06T 7/50* (2017.01); *G06T 7/521* (2017.01); *H04N 5/2355* (2013.01); *H04N 5/23296* (2013.01); *G03B 21/005* (2013.01); *G06T 2207/10028* (2013.01); *H04N 2013/0081* (2013.01)

(58) Field of Classification Search
CPC .............................. H04N 13/271; G01B 11/25
See application file for complete search history.

(56) References Cited

U.S. PATENT DOCUMENTS

| | | | |
|---|---|---|---|
| 9,294,690 B1 * | 3/2016 | Caulfield | ............ H01L 27/1469 |
| 10,516,876 B2 * | 12/2019 | Hicks | ..................... G03B 17/54 |
| 10,917,629 B2 * | 2/2021 | Hicks | ..................... G06T 7/521 |
| 10,992,923 B2 * | 4/2021 | Hicks | ................. H04N 5/23296 |
| 2004/0125205 A1 | 7/2004 | Geng | |

(Continued)

OTHER PUBLICATIONS

Notice of Allowance for U.S. Appl. No. 15/847,676, dated Sep. 3, 2019.
Office Action for U.S. Appl. No. 15/847,676, dated May 23, 2019.

*Primary Examiner* — Christopher K Peterson
(74) *Attorney, Agent, or Firm* — Michael Best & Friedrich LLP

(57) ABSTRACT

Systems, devices, and techniques related to matching features between a dynamic vision sensor and one or both of a dynamic projector or another dynamic vision sensor are discussed. Such techniques include casting a light pattern with projected features having differing temporal characteristics onto a scene and determining the correspondence(s) based on matching changes in detected luminance and temporal characteristics of the projected features.

20 Claims, 9 Drawing Sheets

(56) References Cited

U.S. PATENT DOCUMENTS

| | | |
|---|---|---|
| 2013/0095920 A1 | 4/2013 | Patiejunas et al. |
| 2013/0206967 A1 | 8/2013 | Shpunt et al. |
| 2014/0028804 A1 | 1/2014 | Usuda et al. |
| 2014/0240579 A1* | 8/2014 | Park .................. G06F 3/0488 348/333.11 |
| 2016/0156899 A1 | 6/2016 | Higo et al. |
| 2017/0195654 A1* | 7/2017 | Powers ............... G01J 1/4204 |
| 2018/0180408 A1 | 6/2018 | Du et al. |
| 2019/0149796 A1* | 5/2019 | Tsai .................... H04N 13/296 348/46 |

\* cited by examiner

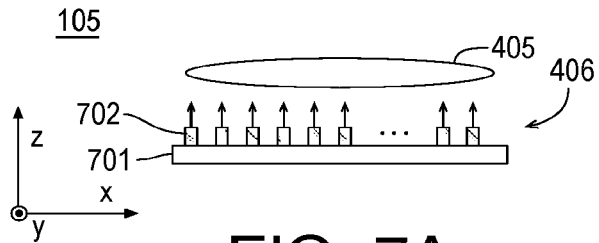
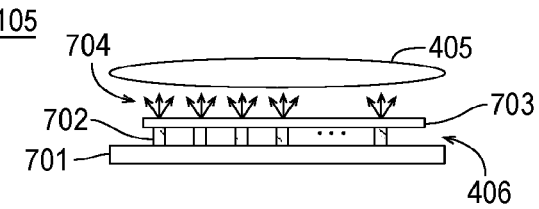
FIG. 7A     FIG. 7B
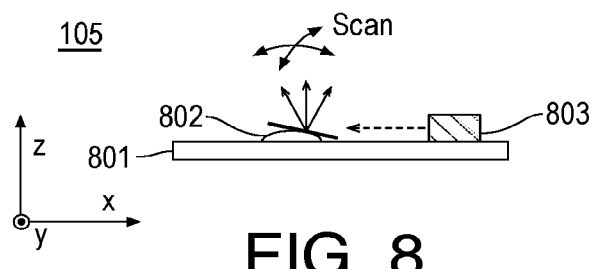
FIG. 8
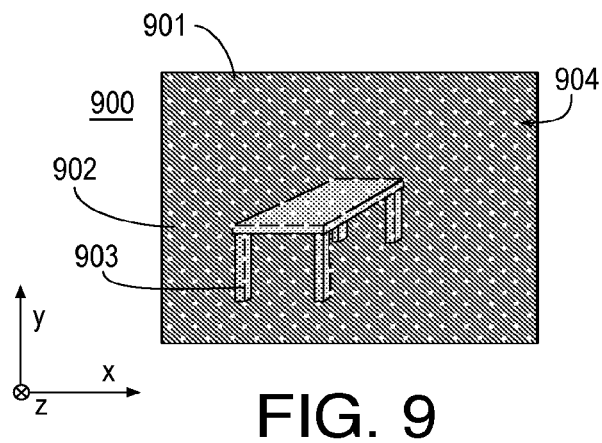
FIG. 9

US 11,330,247 B2

DYNAMIC VISION SENSOR AND PROJECTOR FOR DEPTH IMAGING

CLAIM OF PRIORITY

This application is a Continuation of application Ser. No. 16/698,849, filed Nov. 27, 2019, which is a continuation of and claims priority to U.S. patent application Ser. No. 15/847,676, filed on Dec. 19, 2017, now U.S. Pat. No. 10,516,876 issued on Dec. 24, 2019 and titled "DYNAMIC VISION SENSOR AND PROJECTOR FOR DEPTH IMAGING", which is incorporated by reference in its entirety.

BACKGROUND

In computer vision and other imaging and computing contexts, depth images provide important information for a scene being viewed. A depth image may be generated based on two (e.g., left and right or reference and target) two-dimensional images or between a first image and a projected image. Such applications rely on detecting corresponding features either between two cameras (e.g., two images) or between a camera (e.g., an image) and a projector system (e.g., a projected light pattern) and performing triangulation. Examples of systems for correspondence between camera and projector include coded light cameras and structured light cameras.

A challenge for triangulation based depth cameras is identifying which features in the camera correspond to the features provided by the projection system. Overcoming such challenges may require significant computational resources, which leads to higher cost and power consumption. Another challenge in projection based triangulation systems is the potential interference from sunlight washing out the projection pattern. Current systems use complex structured patterns to maximize the unique nature of the projected pattern, especially along the axis of the triangulation. There is a tradeoff between pattern complexity and pattern size, so the pattern may be repeated over the field of view of the camera. Such repeating patterns limit the size of disparity that can be detected and, therefore, the closest range detectable by the camera such that there is a resulting tradeoff between complexity and minimum range of the camera. Complex processing is used to search for the patterns along the epipolar axis using a search range that is less than or equal to the size of the repeating pattern. Sunlight rejection may be accomplished using a combination of bandpass optical filters that match the projector wavelength and synchronizing the pulsing of the laser projector to the exposure time of a global shutter sensor.

Therefore, current techniques and implementations have limitations. To detect close objects, the camera must be capable of detecting large disparities which leads to large, complex patterns and large search ranges thereby increasing the cost of the projector as well as the cost and power of required computation resources. Such limitations lead to complicated implementation, poor performance in sunlight, and less than desirable depth map results. It is with respect to these and other considerations that the present improvements have been needed. Such improvements may become critical as the desire to utilize depth images in a variety of applications becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7A illustrates a side view of an example dynamic projector including an example VCSEL array;

FIG. 7B illustrates a side view of an example dynamic projector including an example VCSEL array and an example optical element to split emitted light into predefined patterns;

FIG. 8 illustrates a side view of an example dynamic projector including a micro-electro-mechanical systems (MEMS) mirror implementation;

FIG. 9 illustrates a depiction of an example light pattern cast on an example scene;

DETAILED DESCRIPTION

Figure 1:
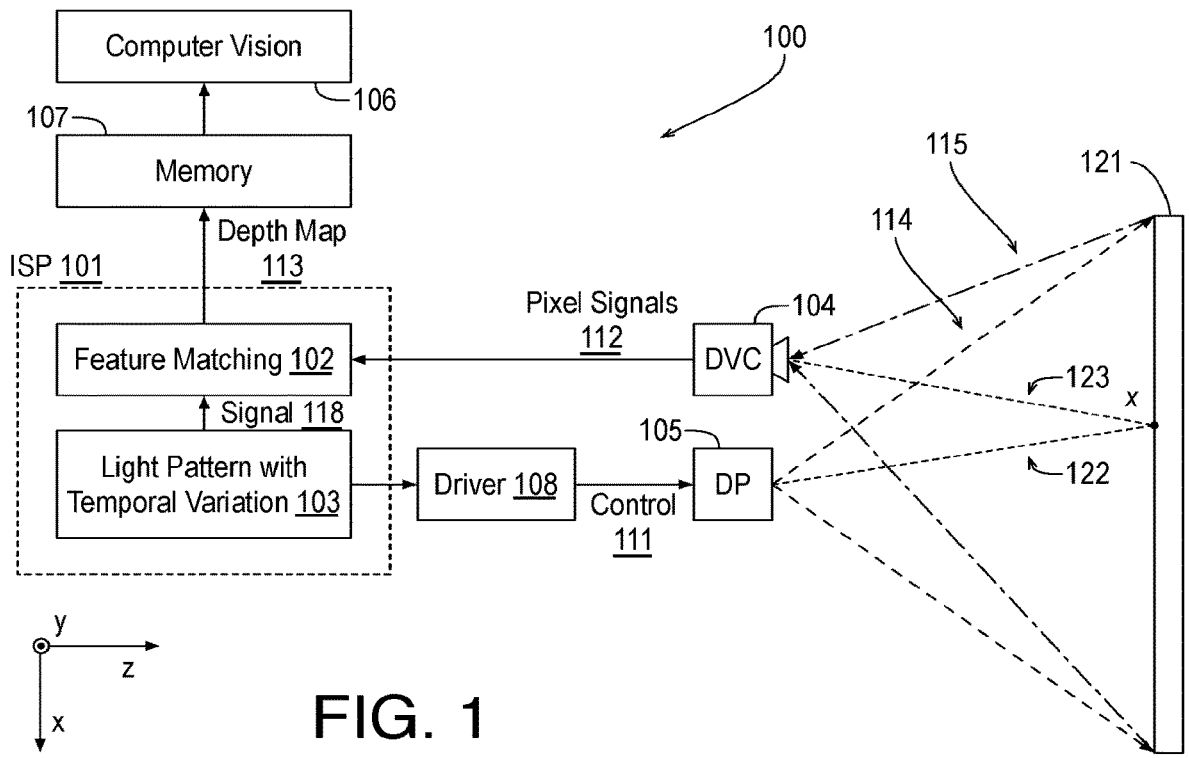
FIG. 1 illustrates components of an example system for determining correspondence between pixels of a dynamic vision sensor and features projected from a dynamic projector.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or such embodiments, or examples, etc., indicate that the implementation, embodiment, or example described may include a particular feature, structure, or characteristic, but every implementation, embodiment, or example may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to affect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to the use of dynamic vision sensors and dynamic projectors for matching features between the dynamic vision sensors and/or a dynamic projector. Such matched features may be used for depth map generation or other applications.

As discussed further herein, a system according to some embodiments includes a dynamic vision sensor based camera and a dynamic pattern projector. As used herein, a dynamic vision sensor (or dynamic image sensor) is any image sensor that detects and indicates events at pixels of the sensor as pixel(s) change (e.g., due to illumination intensity change at the pixel). Such change(s) at pixel(s) of the dynamic vision sensor may be change(s) in luminance over time, for example. For example, the change(s) may be detected at individual pixels or at sets of pixels. As used herein, a set of pixels includes two or more adjacent pixels. Dynamic vision sensors may be contrasted with traditional image sensors as follows. Traditional image sensors detect luminance at a photodiode over a predetermined duration (i.e., an exposure time) as charge is collected in the pixel circuit. Such a traditional image sensor then transmits information from each pixel sensor for the exposure as a frame or picture. The traditional image sensor may transmit complete frames at a predetermined or fixed frame rate for example. For example, traditional image sensors apply a reset voltage to a photodiode to drain any charge in parasitic capacitance of a depletion region and then sample the charge at the end of a fixed integration period. The amount of charge that can be held in the photodiode capacitance limits the dynamic range of the sensor. In contrast, as used herein, a dynamic vision sensor, does not rely on charge collection but instead detects and indicates temporal changes at pixels of the sensor. In an embodiment, a dynamic vision sensor directly measures the photo-current in the photodiode. Changes in the photo-current over time are indicated as events (e.g., ON and OFF or increase/decrease events, etc.) at the corresponding pixel. Such sensors offer high dynamic range since photodiode capacitance does not place a constraint during operation. In an embodiment, in a dynamic vision sensor pixel, the photocurrent is converted to a voltage that is fed to an amplified differencer circuit, which enables detection in increases or decreases in the photocurrent. In a dynamic vision sensor, whenever a pixel increases in intensity, the sensor generates an output and resets the reference based on the new intensity value. The dynamic range of a dynamic vision sensor is limited by the maximum voltage that the photodiode can generate (in comparison with its noise) and dynamic vision sensors may achieve 120 dB (e.g., 6 decades) of dynamic range, which is suitable for outdoor, nighttime applications for example.

Such dynamic vision sensors provide significant improvements in temporal resolution (e.g., about 1-10 μs in contrast to 10-17 ms for traditional image sensors). As discussed further herein, an imaging device includes a dynamic vision sensor and a dynamic projector (or active projector) to provide pixel correlation based on a scene. The pixel correlation may be between a dynamic vision sensor and a dynamic projector or between multiple dynamic vision sensors (based on a light pattern provided by the dynamic projector). By controlling the temporal behavior of the light pattern provided by the dynamic projector, temporal correspondence is leveraged to identify corresponding features of a scene (e.g., a feature detected in a sensor that corresponds to either a projected feature or the same feature in a second sensor).

As discussed, such temporal correspondence may be detected between a dynamic vision sensor and a dynamic projector or between multiple dynamic vision sensors (based on a light pattern provided by the dynamic projector). In embodiments where a dynamic vision sensor and a dynamic projector are implemented, a known temporal characteristic or signature is provided for a projected feature of the light pattern by a pixel of the dynamic projector. A match of the known temporal characteristic or signature is detected at a particular pixel (or multiple adjacent pixels) of the dynamic vision sensor. Thereby, a correspondence is determined between the pertinent feature of the dynamic projector and the pertinent feature of the dynamic vision sensor. Such correspondence may be used for a variety of imaging or computer vision techniques. For example, triangulation may be used to determine a depth value or disparity value for a point or region of a scene.

In embodiments where multiple dynamic vision sensors and a dynamic projector are implemented, a known temporal characteristic or signature is again provided for a projected feature of the light pattern by a pixel of the dynamic projector. The known temporal characteristic or signature is detected at a particular pixel (or multiple adjacent pixels) of a first dynamic vision sensor and a particular pixel (or multiple adjacent pixels) of a second dynamic vision sensor. Thereby, a correspondence is determined between the pertinent features of the first and second dynamic vision sensors. Again, such correspondence may be used for a variety of imaging or computer vision techniques such as triangulation to determine a depth value or disparity value for a point or region of a scene. Although discussed with respect to embodiments with a dynamic vision sensor and a dynamic projector and two dynamic vision sensors and a dynamic projector, any number of dynamic projectors and dynamic vision sensors may be used for improved correspondence, calibration, etc.

FIG. 1 illustrates components of an example system 100 for determining correspondence between pixels of a dynamic vision sensor and features projected from a dynamic projector, arranged in accordance with at least some implementations of the present disclosure. As shown in FIG. 1, system 100 may include an image signal processor (ISP) 101 to implement a feature matching module 102 and a light pattern module 103 (labeled light pattern with temporal variation), a dynamic vision camera (DVC) 104, a dynamic projector (DP) 105, a driver 108, a memory 107, and a computer vision module 106. In an embodiment, dynamic projector 105 and dynamic vision camera 104 are aligned along a first axis (e.g., horizontally along the x-axis as illustrated) such that matched features may be used to generate depth or disparity values for scene 121. For example, the axis between dynamic projector 105 and dynamic vision camera 104 may define an epipolar axis. However, dynamic projector 105 and dynamic vision camera 104 may be provided at any suitable orientation.

Also as shown, dynamic projector 105 projects a light pattern 114 onto a scene 121. Dynamic projector 105 may project light pattern 114 using any suitable type of light, wavelength range, etc. such that light pattern 114 is detectable by dynamic vision camera 104. In an embodiment, dynamic projector 105 projects an infrared (IR) light pattern 114. Such IR light patterns may be advantageous since they will not distract users of system 100 or people in scene 121. Light pattern 114 may include any suitable spatial pattern such as a grid pattern or the like (please refer to FIG. 9). Light pattern 114 also includes temporal patterns among spatial components (e.g., projected features) thereof such that correspondence between features of dynamic projector 105 and dynamic vision camera 104 may be determined using the temporal patterns.

Dynamic vision camera 104 may include any suitable dynamic vision sensor to sense pixel based temporal changes as discussed herein. Furthermore, dynamic projector 105 may include any suitable dynamic projector to provide light pattern 114 having projected features with differing temporal characteristics. As shown, dynamic projector 105 projects light pattern 114 onto scene 121. Dynamic vision camera 104 detects incoming illumination 115 as reflected off of scene 121 such that illumination 115 includes reflectance of light pattern 114. Projected features of light pattern 114 including projected feature 122, which may be a dot or other shape of illumination onto scene 121, have differing temporal characteristics or signals such that reflection 123 from projected feature 122 has the same or substantially the same temporal characteristics. Such temporal characteristic(s) may include, for example, a turn on time, a turn off time, an illumination duration, multiple illumination events (e.g., each illumination event including an on time, illumination duration, off time) of the same or varying frequencies, etc. Furthermore, such temporal characteristic(s) may be unique to only projected feature 122, unique to projected features (including projected feature 122) orthogonal to an epipolar axis between dynamic projector 105 and dynamic vision camera 104, or unique to projected features within a region of scene 121 (e.g., a half of scene 121), or the like. In any event, the temporal characteristics of projected feature 122 (and reflection 123) are used to establish a correspondence between projected feature 122 (and/or the pixel or emitter of dynamic projector 105 casting projected feature 122 onto scene 121) and the pixel (or group of pixels) of dynamic vision camera 104 detecting reflection 123. Projected features as discussed herein may be characterized as projected components, illumination components, projected elements, illumination elements, or the like.

For example, light pattern module 103 provides a signal indicating light pattern 114 (including differing temporal characteristics among components thereof) to driver 108, which may translate the signal to control signal 111, which provides low level signaling to dynamic projector 105 for the output of light pattern 114 over time. Dynamic vision camera 104, via a dynamic vision sensor as discussed herein, senses illumination 115 over time and provides pixel signals 112. Pixel signals 112 may include any suitable data structure or the like such that pixel signals 112 indicate pixel changes for pixels of the dynamic vision sensor over time. For example, pixel signals 112 may include, for each pixel change (increase in illumination greater than a particular amount over time, decrease in illumination greater than a particular amount over time, etc.) a pixel location and temporal characteristics for the change. The temporal characteristics may include a time stamp for the change, whether the change was an increase or decrease, a duration of the change, or other temporal information.

Also as shown, light pattern module 103 provides an illumination pattern signal 118 to feature matching module 102. Illumination pattern signal 118 and the signal (not labeled) provided to feature matching module 102 from light pattern module 103 may be the same or they may be different. Illumination pattern signal 118 indicates characteristics of light pattern 114 pertinent to feature matching module 102 performing feature matching based on illumination pattern signal 118 and pixel signals 112 from dynamic vision camera 104. For example, illumination pattern signal 118 may include any suitable data structure or the like such that illumination pattern signal 118 indicates features of dynamic projector 105 and the temporal characteristics thereof such that matches may be made between illumination pattern signal 118 and pixel signals 112. For example, illumination pattern signal 118 may include, for each pixel change to be implemented by dynamic projector 105 (turn on, illumination duration, turn off, etc.) a pixel location and a time stamp for the pixel change such that a match between the temporal characteristic implemented by a pixel of dynamic projector 105 may be matched to a temporal characteristic indicated by pixel signals 112.

For example, one or more of a turn on time stamp, an illumination duration, a turn off time stamp, etc. implemented in projected feature 122 via dynamic projector 105 may be matched to one or more of a turn on time stamp, an illumination duration, a turn off time stamp, etc. detected by a pixel of dynamic vision camera 104 as indicated by pixel signals 112 to indicate a match of temporal characteristics. As will be appreciated, temporal information such as one or more of a turn on time stamp, an illumination duration, a turn off time stamp, etc. may match within the granularity of data provided by illumination pattern signal 118 and pixel signals 112 due to the rate of travel of projected feature 122; however, some variation may be resolved using thresholding, signal delay processing, or other techniques.

Furthermore, illumination pattern signal 118 includes the location (i.e., the feature's coordinates in angular space) of dynamic projector 105 used to generate projected feature 122 (i.e., the projected angle of projected feature 122) having the pertinent temporal characteristics and pixel signals 112 indicates the location (i.e., the pixel location) of the dynamic vision sensor of dynamic vision camera 104 having the matching temporal characteristics. Thereby, feature matching module 102 has a correspondence between an angular coordinate of dynamic projector 105 and a pixel of dynamic vision camera 104 for a position (x) of scene 121. Such correspondence may be used in a variety of image processing or computer vision contexts. For example, feature matching module 102 may determine a depth value of depth map 113 (or a disparity value of a disparity map) using the correspondence and the spatial orientations of dynamic vision camera 104 and dynamic projector 105. For example, feature matching module 102 may determine a depth value of depth map 113 (or a disparity value of a disparity map) using the projected angle of projected feature 122 (e.g., an angle in the x-y plane between projected feature 122 and the z-direction normal to dynamic projector 105), the location of the pixel(s) of the dynamic image sensor (i.e., as based on the feature correspondence) and the spatial orientations of dynamic vision camera 104 and dynamic projector 105.

In an embodiment, such temporal signaling and detection techniques are repeated for a range, array, or grid of positions of scene 121 by providing any number of projected features in analogy to projected feature 122, detecting a match for the temporal characteristic at a pixel or pixels of the dynamic vision sensor of dynamic vision camera 104 to establish a correspondence between a dynamic projector 105 feature and a feature of dynamic vision camera 104, and, optionally, performing triangulation to determine a depth value of depth map 113 (or a disparity value of a disparity map) using the correspondence. Each projected feature 122 may be provided in series, partially or fully in parallel, etc. such that unique correspondences may be detected. Such temporal characteristics of light pattern 114 are discussed further herein below.

As shown, in an embodiment, depth map 113 (or a disparity map) may be stored to memory 107 and accessed by computer vision module 106. In an embodiment, feature matching module 102 generates feature correspondence data or information (e.g., without generating a depth or disparity map) that include a data structure indicating corresponding features (i.e., features that match or correspond to one another due to having matching temporal characteristics), corresponding depth vision sensor pixels and projected angles, corresponding pixels of dynamic projector 105 and the dynamic vision sensor of dynamic vision camera 104, or the like. Such correspondence information may be stored to memory 107 for subsequent image processing, computer vision procession, or the like. In an embodiment, ISP 101 includes a separate depth map module that uses such correspondence information to generate depth map 113 (or a disparity map).

System 100, system 200 discussed below, or any combination of components thereof may be implemented via any suitable device such as a depth sensor, a depth sensor module, an imaging device, a personal computer, a laptop computer, a tablet, a phablet, a smart phone, a digital camera, a gaming console, a wearable device, a set top device, a drone or the like.

Figure 2:
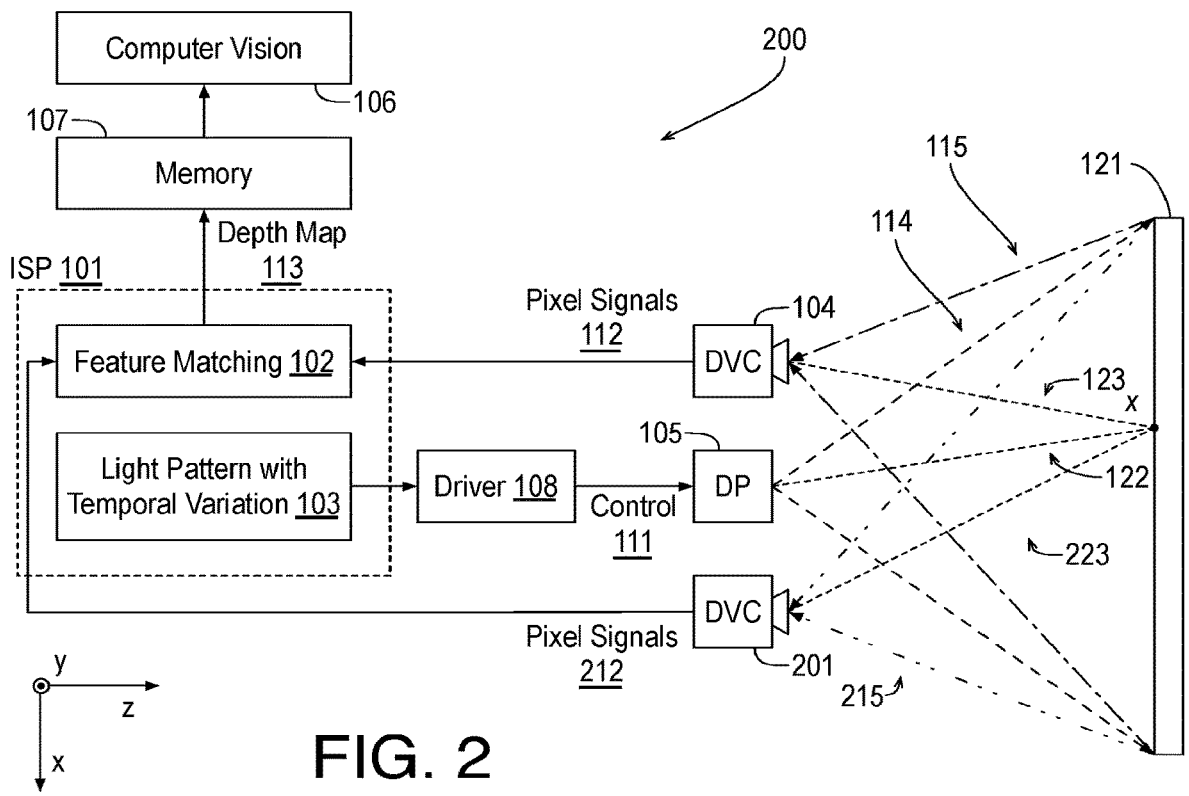
FIG. 2 illustrates components of an example system for determining correspondence between pixels of multiple dynamic vision sensors.

FIG. 2 illustrates components of an example system 200 for determining correspondence between pixels of multiple dynamic vision sensors, arranged in accordance with at least some implementations of the present disclosure. As shown in FIG. 2, system 200 may include any of the components discussed with respect to system 100 along with a second dynamic vision camera (DVC) 201. For example, in the embodiment of system 100, pixel correspondence is determined between dynamic projector 105 and dynamic vision camera 104. In the embodiment of system 200, pixel correspondence is determined between dynamic vision camera 104 and dynamic vision camera 201. In addition, correspondence may also be determined between dynamic projector 105 and one or both of dynamic vision cameras 104, 201 of system 200. In an embodiment, dynamic vision cameras 104, 201 are aligned along a first axis (e.g., horizontally along the x-axis as illustrated) such that matched pixels may be used to generate depth or disparity values for scene 121. For example, the axis between dynamic vision cameras 104, 201 may define an epipolar axis. In an embodiment, dynamic projector 105 is also aligned horizontally with respect to dynamic vision cameras 104, 201.

However, dynamic projector 105 may be provided at any suitable orientation. In some embodiments, dynamic projector 105 is aligned off axis with respect to dynamic vision cameras 104, 201. Such embodiments may provide for calibration recovery after a drop of system 200 or another event that provides for a loss of calibration for system 200, for example. In an embodiment, dynamic vision cameras 104, 201 and dynamic projector 105 are aligned in the shape of a triangle such that separate epipolar axes are formed between each dynamic vision camera and dynamic projector pair. For example, dynamic projector 105, dynamic vision sensor 104, and dynamic vision sensor 201 may be configured in a triangular shape such that dynamic projector 105 is off-axis and orthogonal to an axis between dynamic vision sensor 104 and dynamic vision sensor 201. For example, dynamic vision sensor 104 and dynamic vision sensor 201 may have an axis therebetween (e.g., in the x-direction) and dynamic projector 105 may be between them and off-axis (e.g., between them in the x-direction and offset in the y-direction). In an embodiment, dynamic vision cameras 104, 201 are part of a grid of dynamic vision cameras such that the grid includes 9, 16 or more dynamic vision cameras.

As discussed with respect to dynamic vision camera 104, dynamic vision camera 201 may include any suitable dynamic vision sensor to sense pixel based temporal changes. As discussed, dynamic projector 105 projects light pattern 114 onto scene 121. Dynamic vision cameras 104, 201 detect incoming illumination 115, 215, respectively, as reflected off of scene 121 such that illumination 115, 215 includes reflectance of light pattern 114. As discussed, projected features of light pattern 114 including projected feature 122 have differing temporal characteristics or signals such that reflections 123, 223 from projected feature 122 has the same or substantially the same temporal characteristics.

The matching temporal characteristics of reflections 123, 223 are then used to establish a correspondence between a feature (or group of pixels) of dynamic vision camera 104 detecting reflection 123 and a feature (or group of pixels) of dynamic vision camera 201 detecting reflection 223.

For example, light pattern module 103 provides a signal indicating light pattern 114 (including differing temporal characteristics among components thereof) to driver 108, which may translate the signal to control signal 111, which provides low level signaling to dynamic projector 105 for the output of light pattern 114 over time. Dynamic vision cameras 104, 201, via dynamic vision sensors therein, senses illumination 115, 215, respectively, over time and provide pixel signals 112, 212, respectively, to feature matching module 102 or another module of image signal processor 101. As discussed with respect to pixel signals 112, pixel signals 212 may include any suitable data structure or the like such that pixel signals 212 indicate pixel changes for pixels of the dynamic vision sensor of dynamic vision camera 201 over time. For example, pixel signals 212 may include, for each pixel change (increase in illumination greater than a particular amount over time, decrease in illumination greater than a particular amount over time, etc.) a pixel location and temporal characteristics for the change. The temporal characteristics may include a time stamp for the change, whether the change was an increase or decrease, a duration of the change, or other temporal information.

As shown, pixel signals 112 and pixel signals 212 are provided to feature matching module 102. Feature matching module 102 determines matches between temporal characteristics as indicated between pixel signals 112 and pixel signals 212. For example, one or more temporal characteristics are matched between pixel signals 112 and pixel signals 212. Such matching characteristics may be any suitable temporal characteristics such as a time stamp of increased illumination (e.g., two pixel locations having increased luminance at the same time), a time stamp of decreased illumination (e.g., two pixel locations having decreased luminance at the same time), multiple matching ON/OFF events of matching frequency (e.g., two pixel locations having matching increased and decreased luminance events at the same time), or any combination thereof. As will be appreciated, temporal information such as time stamps of increased or decreased illumination, duration, etc. may match within the granularity of data provided by pixel signals 112, 212 due to the rate of travel of projected feature 122; however, some variation may be resolved using thresholding, signal delay processing, or other techniques.

Furthermore, pixel signals 112 indicate the feature (i.e., the pixel location) of the dynamic vision sensor of dynamic vision camera 104 and the feature (i.e., the pixel location) of the dynamic vision sensor of dynamic vision camera 201 having the matching temporal characteristics. Thereby, feature matching module 102 has a correspondence between a pixel location of dynamic vision camera 104 and a pixel location of dynamic vision camera 201 for a position (x) of scene 121. Such correspondence may be used in a variety of image processing or computer vision contexts. For example, feature matching module 102 may determine a depth value of depth map 113 (or a disparity value of a disparity map) using the correspondence. Such temporal signaling and detection techniques may be repeated for a range, array, or grid of positions of scene 121 by providing any number of projected features in analogy to projected feature 122, detecting a match for the temporal characteristic of a feature detected by the dynamic vision sensor of dynamic vision camera 104 and a feature detected by the dynamic vision sensor of dynamic vision camera 201, and, optionally, performing triangulation to determine a depth value of depth map 113 (or a disparity value of a disparity map) using the correspondence. Each projected feature 122 may be provided in series, partially or fully in parallel, etc. such that unique correspondences may be detected.

As discussed with respect to system 100, depth map 113 (or a disparity map) may be stored to memory 107 and accessed by computer vision module 106 or feature matching module 102 may generate correspondence information such as a data structure indicating corresponding features (i.e., features that match or correspond to one another due to having matching temporal characteristics) between the dynamic vision sensor of dynamic vision camera 104 and the dynamic vision sensor of dynamic vision camera 201. Such correspondence information may be stored to memory 107 for subsequent image processing, computer vision procession, or the like.

Figure 3:
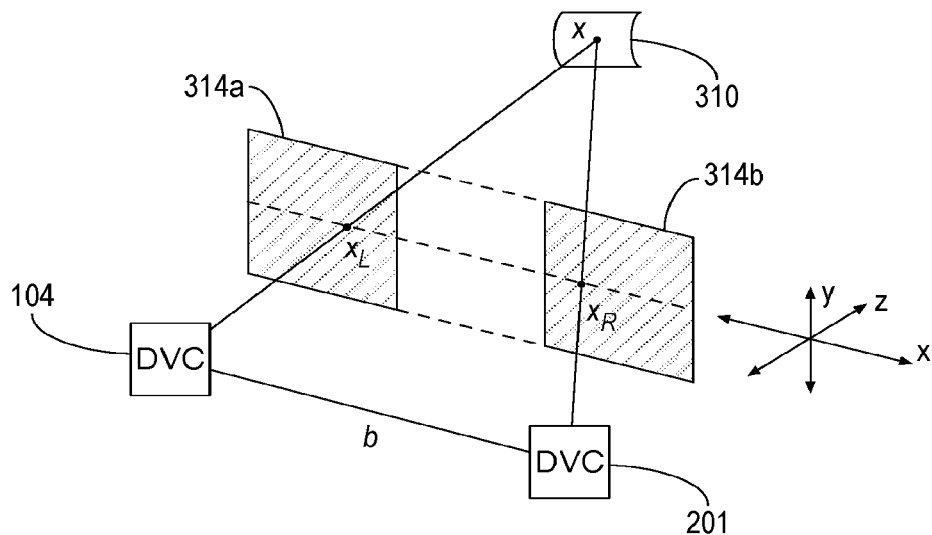
FIG. 3 illustrates an example stereoscopic image matching.

FIG. 3 illustrates an example stereoscopic image matching 300, arranged in accordance with at least some implementations of the present disclosure. As shown in FIG. 3, stereoscopic image matching 300 may include attaining first and second (or left and right) matching features (as indicated by features xL and xR within image planes 314a and 314b for the sake of clarity of presentation). As discussed, matching features may be determined by matching pixels (e.g., locations of pixels) between dynamic vision cameras 104, 201 using temporal characteristics. As shown, scene 121 may include an example surface 310. Scene 121 may include any suitable scene including indoor or outdoor scenes, scenes including objects and/or people, and so on.

Stereo matching techniques may determine a depth image based on triangulating corresponding features (and/or the locations of corresponding pixels between the dynamic vision sensors). For example, as shown in FIG. 3, given left and right image planes 314a and 314b, each including a representation of three-dimensional point x on surface 310, the depth, d, of x, may be determined based on d=f*b/disp, where f and b are the focal length and base line, respectively, and disp, is the disparity for x, indicating the pixel displacement of x between the pertinent pixel of the dynamic vision sensor of dynamic vision camera 104 and the corresponding (matching) feature of the dynamic vision sensor of dynamic vision camera 201. Furthermore, the baseline, b, dynamic vision camera 104 to dynamic vision camera 201 provides an epipolar line or axis. As is discussed further herein, temporal characteristic(s) of projected features are varied across scene 121 to provide correspondence between features detected by dynamic vision cameras 104, 201. In some embodiments, temporal characteristic(s) of projected features may be the same along the y-axis (e.g., orthogonal to the discussed epipolar axis or plane) since pixel matching is not performed along the y-axis but is instead restricted to the matching along the x-axis. For example, such projected features may be projected by pixels that are orthogonal to an epipolar axis between the dynamic projector and the dynamic vision sensor and/or such projected features may be projected at angles that are orthogonal to the epipolar axis.

Although illustrated with respect to system 200, referring again to FIG. 1, depth values may be generated using similar techniques by replacing the pixel displacement of x between the pertinent feature of the dynamic vision sensors of dynamic vision cameras 104, 201 with the pixel displacement of x between the pertinent feature of the dynamic vision sensor of dynamic vision camera 104 and the corresponding (matching) feature of dynamic projector 105 and/ or with a location of the pixels in one or both of dynamic vision cameras 104, 201 and a projected angle from the dynamic projector. For example, the projected angle may be an angle between the positive z-direction and the projected feature taken in the x-z plane. However, any suitable projected angle may be used.

Figure 4:
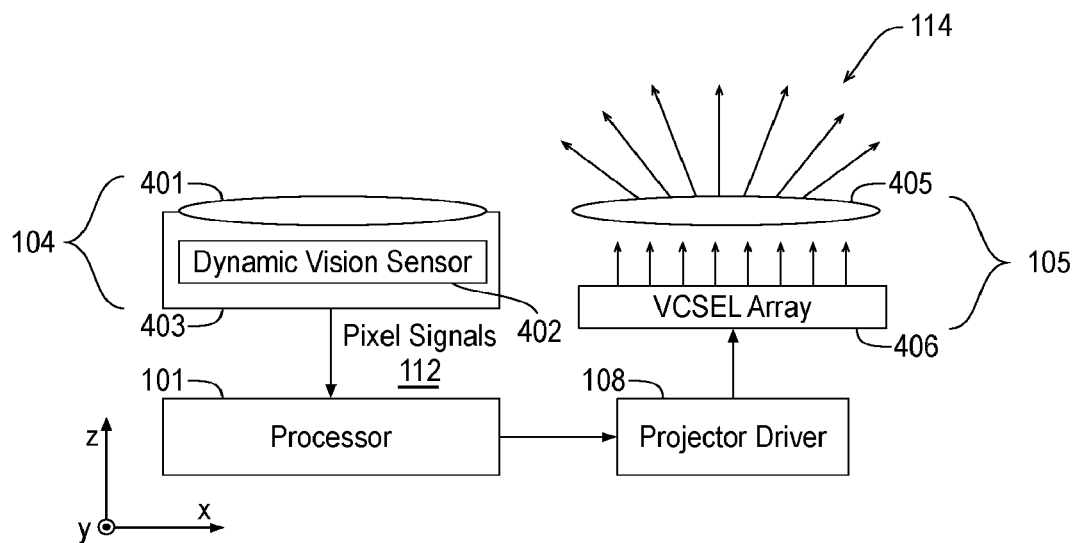
FIG. 4 illustrates exemplary components of the example system of FIG. 1.

FIG. 4 illustrates exemplary components of example system 100, arranged in accordance with at least some implementations of the present disclosure. In particular, FIG. 4 illustrates an example dynamic vision camera 104 and an example dynamic projector 105. As shown, dynamic vision camera 104 may include a lens 401 adjacent to a dynamic vision sensor 402, both of which are implemented within a housing 403. Lens 401 may be moveable to focus illumination 115 onto dynamic vision sensor 402. Dynamic vision camera 104 may further include circuitry or the like to generate pixel signals 112 based on received illumination such as illumination 115 (please refer to FIG. 1).

Figure 5:
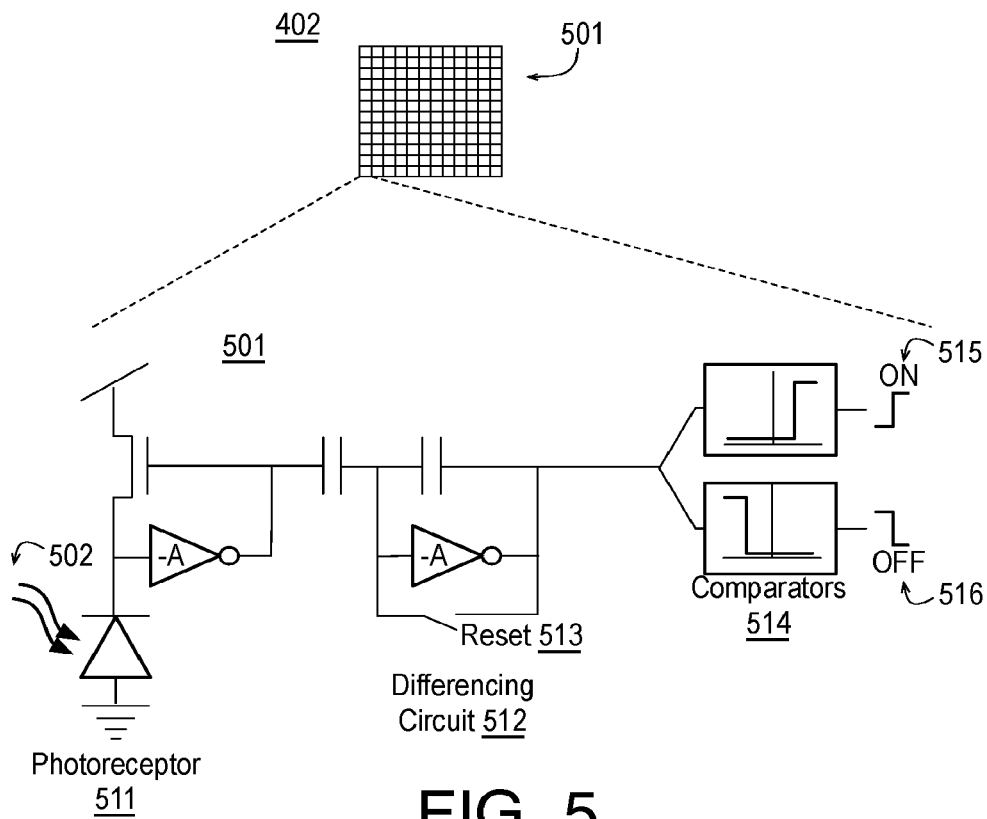
FIG. 5 illustrates an example dynamic vision sensor.

FIG. 5 illustrates an example dynamic vision sensor 402, arranged in accordance with at least some implementations of the present disclosure. As shown in FIG. 5, dynamic vision sensor 402 includes a grid of sensors pixels 501. Sensors pixels 501 may include any suitable circuitry and materials that may provide for the detection of a change in illumination over time and the indication of such a change. As discussed, a set of sensor pixels 501 are pixels that are adjacent to at least one other pixel in the set. As shown, in an embodiment, an exemplary sensor pixel 501 includes a photoreceptor 511, a differencing circuit 512 (including a reset switch 513), and comparators 514. Incident light 502 is detected by photoreceptor 511 (e.g., including a photodiode) and photo-current from photoreceptor 511 is converted to a voltage that is fed to differencing circuit 512 (e.g., an amplified differencer circuit) that enables detection in increases or decreases in the photocurrent via comparators 514. An increase in photocurrent is detected as an ON event 515 and a decrease in photocurrent is detected as an OFF event 516. For example, sensor pixels 501 do not rely on charge collection (as in traditional image sensors) and instead directly measure photo-current in photoreceptor 511. Such a configuration offers advantageously high dynamic range in contrast to traditional sensor pixels since photodiode capacitance does not provide a constraint. Sensor pixels 501 of dynamic vision sensor 402 may attain 120 dB of dynamic range in some examples.

Figure 6:
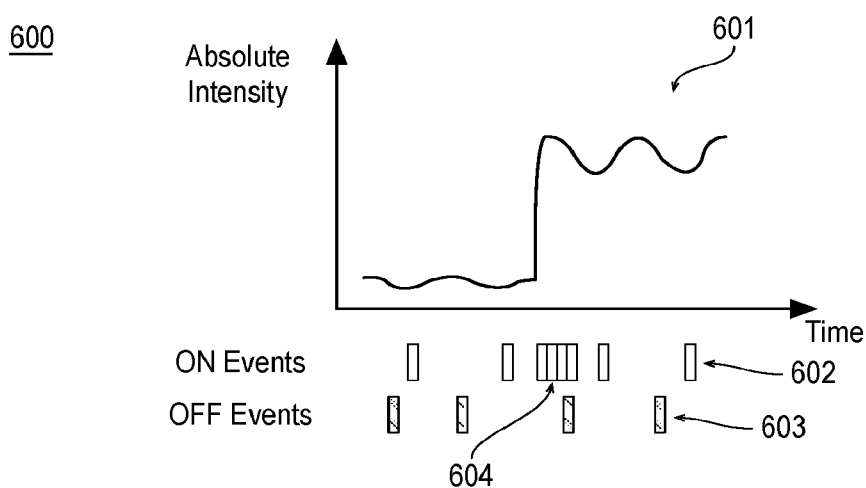
FIG. 6 illustrates an example timing diagram for a particular pixel of a dynamic vision sensor in operation.

FIG. 6 illustrates an example timing diagram 600 for a particular pixel of a dynamic vision sensor in operation, arranged in accordance with at least some implementations of the present disclosure. As shown in FIG. 6, as the light level (e.g., illumination or intensity) at a particular pixel, as indicated by the absolute intensity of example pixel intensity 601, increases or decreases over time, ON events 602 (e.g., corresponding to absolute intensity increases) and OFF events 603 (e.g., corresponding to absolute intensity decreases) are detected. Herein, OFF events are indicated using a hatched fill and ON events are indicated without use of a fill. As shown with respect to ON events 604, when there is a sharp increase in light level, many or several ON events are generated in rapid succession. Thereafter, the circuit settles and returns to generating ON and OFF events as triggered by changes in the absolute intensity. In some embodiments, ON and OFF events 602, 603 included in pixel signals 112, 212. For example, pixel signals 112, 212 may include information of the pixel corresponding to timing diagram 600 (e.g., an x, y pixel location or other identifier) and information indicating ON and OFF events 602, 603 such as a time stamp of the event and whether the event is an ON or OFF event. In embodiments where matching is performed between dynamic vision sensor, such time stamps or other data representing ON and/or OFF events may be matched between pixel signals 112, 212 as discussed and the pixels corresponding thereto may be defined as matching or corresponding pixels for the purposes of depth image processing or the like. In embodiments where matching is performed between a dynamic vision sensor and a dynamic projector, such time stamps or other data representing ON and/or OFF events from pixel signals 112 may be matched to the same or similar information or data provided by illumination pattern signal 118. For example, illumination pattern signal 118 may have a data format that matches pixel signals 112, which in turn may be defined by ON and OFF events 602, 603 as generated by sensor pixels 501.

Returning to FIG. 4, as discussed, dynamic vision camera 104 including lens 401 and dynamic vision sensor 402 within housing 403 may be implemented in system 100. The same or similar components may also be implemented as dynamic vision camera 201 as discussed with respect to system 200. Also as shown in FIG. 4, in an embodiment, dynamic projector 105 of system 100 or system 200 may include an array of vertical-cavity surface-emitting lasers (VCSELs), VCSEL array 406, adjacent to a lens 405. VCSEL array 406 and lens 405 may also optionally be implemented within a separate housing (not shown) or within housing 403. VCSEL array 406, under the control of driver 108 (illustrated as a projector driver in FIG. 4), emits light emission 407, which may be focused by lens 405 to generate light pattern 114 as discussed herein.

FIG. 7A illustrates a side view of an example dynamic projector including an example VCSEL array 406, arranged in accordance with at least some implementations of the present disclosure. As shown in FIG. 7A, VCSEL array 406 includes an array or grid of VCSELs including VCSEL 702 disposed on/and or within a substrate 701. For example, VCSEL array 406 may be arranged on substrate 701 in a grid pattern in the x-y plane. The embodiment of FIG. 7A may provide a dynamic projector that provides a 1:1 correspondence between each VCSEL of VCSEL array 406 and projected features (e.g., beams, points, or dots) projected onto scene 121. As shown, each VCSEL 702 is assembled into a 2D array over substrate 701 and each VCSEL 702 emits, under control of driver 108, through lens 405 (e.g., a projector lens) to cast a corresponding projected feature onto scene 121. For example, each VCSEL 702 may represent a row of VCSELs extending in the y-axis along substrate 701.

In an embodiment, each VCSEL 702 is independently controllable to separately provide a projected feature having a particular temporal characteristic or characteristics as discussed herein. In another embodiment, each row of VCSELs 702 grouped together along the y-axis is independently (i.e., on a row-by-row basis) controllable to provide projected features having a particular temporal characteristic or characteristics such that the characteristics match along the y-axis. In such embodiments, the y-axis is arranged orthogonal to the epipolar axis of triangulation (please refer to FIGS. 1, 2, and 3) such that the temporal characteristic or characteristics not being unique along the y-axis does not hinder matching pixels along the epipolar axis (e.g., along the x-axis). For example, the temporal characteristic or characteristics of projected features may be unique along the x-axis but not unique along the y-axis.

FIG. 7B illustrates a side view of an example dynamic projector including example VCSEL array 406 and an example optical element 703 to split emitted light into patterns 704, arranged in accordance with at least some implementations of the present disclosure. As shown in FIG. 7B, optical element 703 may be disposed on or over VCSEL array 406 such that the emitted light from each of VCSELs 702 is split into sets or groups of predefined patterns 704 such that each of patterns 704 includes multiple projected features or illumination components in a defined pattern. For example, using optical element 703, an entire pattern (e.g., projected feature) may be generated by each of VCSELs 702. Optical element 703 may be any suitable optical element or include any suitable optical elements that split emitted light from each of VCSELs 702 into a set or group of projected features to define patterns 704. In an embodiment, optical element 703 is a diffractive optical element. In an embodiment, optical element 703 is a microlens or multiple microlenses. In an embodiment, optical element 703 is a metasurface or metamaterial. Patterns 704 may be the same for each of VCSELs 702 or they may be different. Furthermore, each of patterns 704 of projected features may be any suitable patterns of any predefined projected features such as dots or other shapes. In an embodiment, patterns 704 provide projected features that are orthogonal to an epipolar axis as discussed herein.

FIG. 8 illustrates a side view of an example dynamic projector including a micro-electro-mechanical systems (MEMS) mirror implementation, arranged in accordance with at least some implementations of the present disclosure. For example, dynamic projector 105 or any other dynamic projector discussed herein may implement the components of FIG. 8 to provide light pattern 114 having projected features with differing temporal characteristics as discussed herein. As shown in FIG. 8, dynamic projector 105 may include an edge laser 803 and a 2D MEMS scanner 802 mounted to a substrate 801. Additional optical elements may also be employed in the optical path (e.g., diffusers, integrators, and collimators). In an embodiment, MEMS scanner 802 is configured to scan over both a first projection angle (e.g., vertically) and an orthogonal second projection angle (e.g., horizontally) to vary the illumination point location along a first axis (e.g., y-axis) and second axis (e.g., x-axis) in response to an electrical signal applied thereto. For example, MEMS scanner 802 may scan in response to control signal 111 provided by driver 108. Light from edge laser 803 may be temporally controlled (e.g., pulsed) as MEMS scanner scans to generate light pattern 114 having varying temporal characteristics as discussed herein. For example, edge laser 803 and MEMS scanner 802 may operate in concert to provide light pattern 114 having varying temporal characteristics across scene 121.

In another embodiment, MEMS scanner 802 is configured to scan only in one projection angle (e.g., horizontally along the x-axis) while being fixed in the other angle (e.g., vertically or along the y-axis). For example, MEMS scanner 802 may scan in the x-direction in response to control signal 111 provided by driver 108. Furthermore, light from edge laser 803 may be temporally controlled (e.g., pulsed) as MEMS scanner scans to generate light pattern 114 having varying temporal characteristics as discussed herein. As discussed, in some embodiments, pixel matching is performed only in the x-direction and having temporal characteristics that do not vary along the y-axis (e.g., the epipolar axis of triangulation) does not hinder pixel matching in the x-direction. Indeed, such characteristics may reduce scan times, pixel matching times, etc.

Although discussed with respect to a VCSEL array projector embodiment (e.g., FIG. 7) and a MEMS scanner projector embodiment (e.g., FIG. 8), any suitable dynamic projector may be implemented to generate light pattern 114.

In some embodiments, an emitter of a dynamic projector includes a mirror of a deformable micro-mirror device (DMD). For example, a DMD may include a projection array having a 100×100 mirror array, a 1000×1000 mirror array, or more. In addition to the projection array, such a projector may further include one or more edge-emitting (or surface emitting) laser light sources configured to shine on all, or a portion of, the mirror array.

FIG. 9 illustrates a depiction of an example light pattern 901 cast on an example scene 900, arranged in accordance with at least some implementations of the present disclosure. For example, FIG. 9 illustrates an example light pattern 901 with each pixel location of a dynamic projector such as dynamic projector 105 illuminated simultaneously to generate each available projected feature 904 for the purposes of clarity of presentation. For example, light pattern 114 may illuminate projected features 904 with various temporal characteristics as discussed herein. For example, scene 900 may be illuminated, at any time instance, by one or all or any combination of projected features 904 of light pattern 901. In practice, some or all of projected features 904 having varying temporal characteristics such that pixel matches may be detected using such varying temporal characteristics of projected features 904. For example, one or more dynamic vision sensors detect temporal changes of projected features 904 as pixel responses therein and such responses may be correlated between dynamic vision sensors and/or between a dynamic vision sensor and the dynamic projector used to generate the temporal changes of projected features 904 to provide pixel matches.

As shown in FIG. 9, scene 900 includes a light pattern 901 (i.e., white dots in the illustration) from light pattern 114 being projected or cast onto scene 121. As shown, in an embodiment, light pattern 901 may have a grid like pattern of projected feature 904 dots, beams, specks, or the like. However, light pattern 901 may have any suitable pattern such as a random speckle pattern, a concentric ring pattern, etc. of projected feature 904 shapes projected shapes such as squares, rectangles, diamonds, or the like. Scene 900 may include any suitable scene. In the illustrated embodiment, scene 900 includes a foreground object 903 (e.g., a table) and a background 902. In some embodiments, it is advantageous to determine a depth map of scene 900 such that the depth map indicates depths of objects as they are positioned with scene 900.

Figure 10:
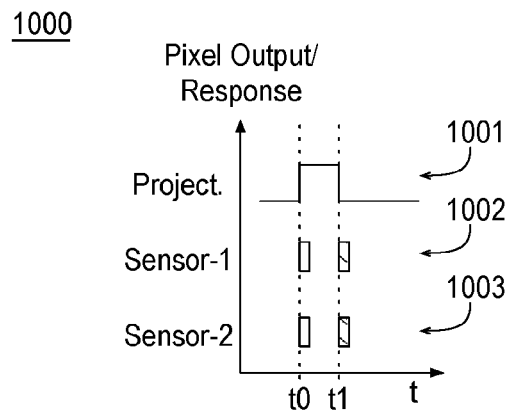
FIG. 10 illustrates an example signal timing diagram for particular pixels of a dynamic projector, a first dynamic vision sensor, and a second dynamic vision sensor in operation.

FIG. 10 illustrates an example signal timing diagram 1000 for particular pixels of a dynamic projector, a first dynamic vision sensor, and a second dynamic vision sensor in operation, arranged in accordance with at least some implementations of the present disclosure. As shown in FIG. 10, a pixel of a dynamic projector may provide, for a particular projected feature, an illumination intensity signal 1001 such that the pixel (and corresponding projected feature) is initially off, is turned on at time t0, and is turned off at time t1 (such that the illumination event has an illumination duration of t1–t0). As shown, in response to illumination intensity signal 1001 a pixel (or multiple adjacent pixels) of a first dynamic vision sensor reacts with an event signal 1002 indicating an ON event at time t0 and an OFF event at time t1 such that there is a corresponding illumination duration determined as the time difference between the ON event and the OFF event (e.g., t1–t0). Similarly, a second dynamic vision sensor reacts with an event signal 1003 indicating an ON event at time t0 and an OFF event at time t1 and a corresponding illumination duration (e.g., t1–t0).

As will be appreciated, prior to signal analysis, the only known pixel corresponding to signals 1001, 1002, 1003, is the pixel of the dynamic projector emitting illumination intensity signal 1001 via the corresponding projected feature. Upon receiving one or both of event signals 1002, 1003, feature matching module 102 or similar component determines which pixel of the first dynamic vision sensor has an event signal that matches illumination intensity signal 1001 (for matching between dynamic projector and dynamic vision sensor) and/or event signal matches between pixels of the first dynamic vision sensor and the second dynamic vision sensor.

Such matching may be performed using any suitable technique or techniques. For embodiments that match pixels of a dynamic projector and pixels of a dynamic vision sensor, pixel signals such as event signal 1002 (e.g., as provided by pixel signals 112) for some or all pixels of the dynamic vision sensor are monitored for one or more of an ON event at time t0 (or within a threshold of time t0), an OFF event at time t1 (or within a threshold of time t1), and difference between temporally adjacent ON and OFF events of t1−t0. For embodiments that match pixels between dynamic vision sensors, pixel signals such as event signal 1002 (e.g., as provided by pixel signals 112) and event signal 1003 (e.g., as provided by pixel signals 212) for some or all pixels of the dynamic vision sensors are monitored for one or more ON events that are at the same time t0 (or within thresholds of time t0), OFF events that are at the same time t1 (or within a thresholds of time t1), and differences between temporally adjacent ON and OFF events of t1−t0 (or within a threshold of the difference t1−t0). Thereby, matching pixels may be determined and such correspondences may be saved to memory, used for depth map generation, and/or other computer vision or imaging applications. As will be appreciated, signals 1001, 1002, 1003 illustrates substantially perfect timing therebetween. However, in practice, lag or signaling loss may be mitigated using thresholding techniques, signal analysis techniques, etc.

FIG. 10 illustrates relatively simple signals 1001, 1002, 1003 for the sake of clarity of presentation. Such signals may have any suitable characteristics as driven by illumination intensity signal 1001. For example, illumination intensity signal 1001 may include multiple on and off events of the same or differing intensities with the same or differing durations having the same or different times therebetween (e.g., in the off state), and the like. Furthermore, such temporal characteristics (e.g., turning a projected feature on at a particular start time, holding on for a particular duration, turning off at a particular end time, and optionally repeating with the same duration, differing duration, intensity, frequency, etc.) may be provided to only one projected feature or to multiple projected features simultaneously such that pixel correspondence may be provided as discussed herein.

With reference to FIG. 9, a simplistic approach may be to turn on and off each of projected features 904 in turn in the same manner (e.g., using the same temporal characteristics except for start and stop times) and to monitor the pixels of either one or both of dynamic vision cameras to determine correspondence. While such an approach may offer ease of implementation, it may be inefficient in terms of detection time, depth map generation time, etc. Instead, differing temporal characteristics in addition to different start and stop times may be used such that some projected features 904 are illuminated simultaneously (with differing temporal characteristics). For example, the discussed temporal characteristics of multiple on and off events of differing numbers, duration, intensity, frequency, etc. may be used simultaneously (in time) at various projected features 904. In addition or in the alternative, the same temporal characteristics at the same time may be used at projected features 904 that are aligned vertically along the y-axis (e.g., orthogonal to an epipolar axis) as discussed herein.

Figure 11:
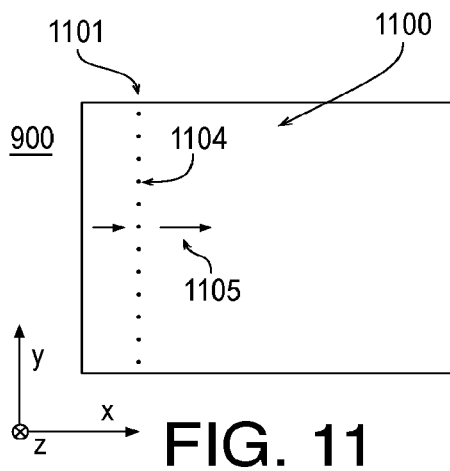
FIG. 11 illustrates an example illumination scheme for use in feature matching.

FIG. 11 illustrates an example illumination scheme 1100 for use in feature matching, arranged in accordance with at least some implementations of the present disclosure. As will be appreciated, any illumination scheme discussed herein is implemented by pixels of dynamic projector 105. Such illumination schemes are presented with respect to scene 900 for the sake of clarity of presentation; however such illumination schemes are implemented by pixels of dynamic projector 105 at scale. For example, each projected feature provided by an illumination scheme is generated using a pixel of dynamic projector 105. Furthermore, in the following, scene 900 is shown with elements thereof removed and projected features are shown as black dots for the sake of clarity of presentation. As shown in FIG. 11, illumination scheme 1100 includes providing, for a row 1101 of projected features 1104, the same illumination intensity signal simultaneously. As discussed, a first axis (e.g., horizontal, x-axis) may be aligned with the feature matching while a second axis (e.g., vertical, y-axis) is orthogonal thereto. Such an orientation may be exploited by providing the same illumination intensity signal (having particular temporal characteristics) simultaneously such that row 1101 of projected features 1104 (and also pixels of dynamic projector 105) is orthogonal to an epipolar axis of triangulation.

As shown, in an embodiment, the illumination intensity signal (having particular temporal characteristics) is scanned to a next row (or column) of projected features 1104 (and also pixels of dynamic projector 105) in a scan direction 1105 over time. For example, projected features 1104 of row 1101 are illuminated in a first time frame using the particular temporal characteristics. Then, in a subsequent time frame, another row of projected features 1104 are illuminated using the particular temporal characteristics, and so on across scene 900.

Figure 12:
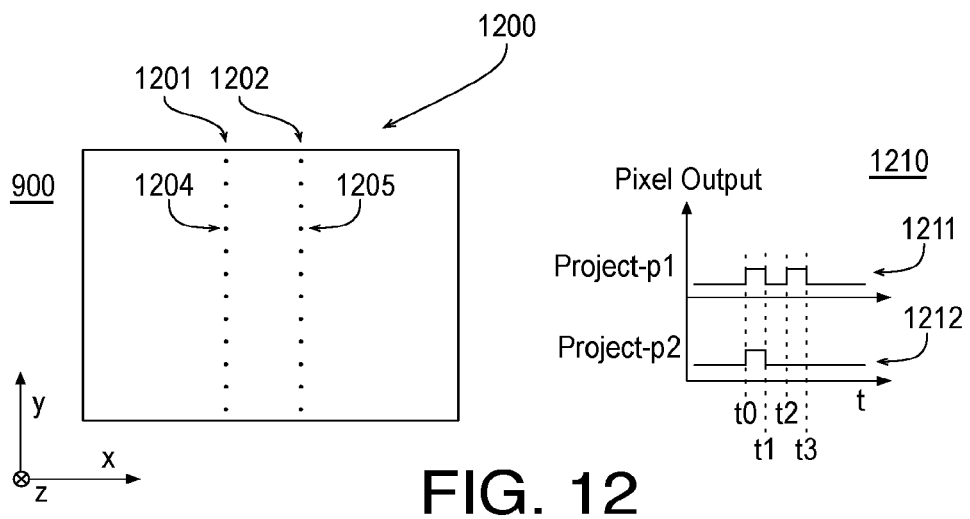
FIG. 12 illustrates another example illumination scheme for use in feature matching.

FIG. 12 illustrates another example illumination scheme 1200 for use in feature matching, arranged in accordance with at least some implementations of the present disclosure. As shown in FIG. 12, illumination scheme 1200 includes providing, for a first row 1201 of projected features 1204 and a second row 1202 of projected features 1205, different illumination intensity signals 1211, 1212 such that illumination intensity signals 1211, 1212 overlap at least partially. For example, illumination intensity signal 1211 may be implemented by each projected feature 1204 of first row 1201 and illumination intensity signal 1212 may be implemented by each projected feature 1205 of first row 1202. As shown with respect to timing diagram 1210, illumination intensity signal 1211 has temporal characteristics including a first on/off illumination and a second on/off illumination while illumination intensity signal 1212 has temporal characteristics including a single on/off illumination that corresponds temporally to the first on/off illumination of illumination intensity signal 1211. As discussed with respect to FIG. 12, rows 1201, 1202 may have the same illumination intensity signals 1211, 1212 within the rows since feature matching is not performed along the y-axis. Furthermore, the differing temporal characteristics of illumination intensity signals 1211, 1212 allow for feature matching along the x-axis. For example, a pixel of a dynamic vision sensor (when matching sensor to projector) or pixels of multiple dynamic vision sensors (when matching between sensors) are matched based on a response to illumination intensity signal 1211 or a response to illumination intensity signal 1212 such that the feature matching is differentiated based on the different differing temporal characteristics of illumination intensity signals 1211, 1212.

For example, a pixel of a dynamic vision sensor responsive to illumination intensity signal 1211 would have an ON event at time t0, an OFF event at time t1, an ON event at time t2, and an OFF event at time t3. In contrast, a pixel of a dynamic vision sensor responsive to illumination intensity signal 1212 would have an ON event at time t0 and an OFF event at time t1 without any events at times t2, t3. Such illumination intensity signals 1211, 1212 may be varied using any suitable technique or techniques such as differing illumination start times, differing illumination durations, differing illumination end times, different numbers of illumination events, different illumination frequencies, etc. As used herein, the term illumination start time indicates a start of a projected feature being turned on or ramped up to an on state, an illumination duration indicates an projected feature being held in an on state (whether at the same or varying intensity), an illumination end time indicates a projected feature being turned off or ramped to an off state, an illumination event indicates a projected feature being on and off or otherwise cycled between a high and low illumination intensity, and an illumination frequency indicates a frequency between start times, end times, or the like.

As discussed, differing temporal characteristics such as those discussed with respect to illumination intensity signals 1211, 1212 may be the same along a first axis (e.g., e.g., vertically along the y-axis) and different along a second axis (e.g., horizontally along the x-axis). In other embodiments, differing temporal characteristics are provided at other locations across or around a scene (as provided by pixels of a dynamic projector). Furthermore, in some embodiments, the same temporal characteristics may be provided along an epipolar axis so long as they are separated by a sufficient distance to allow feature matching.

Figure 13:
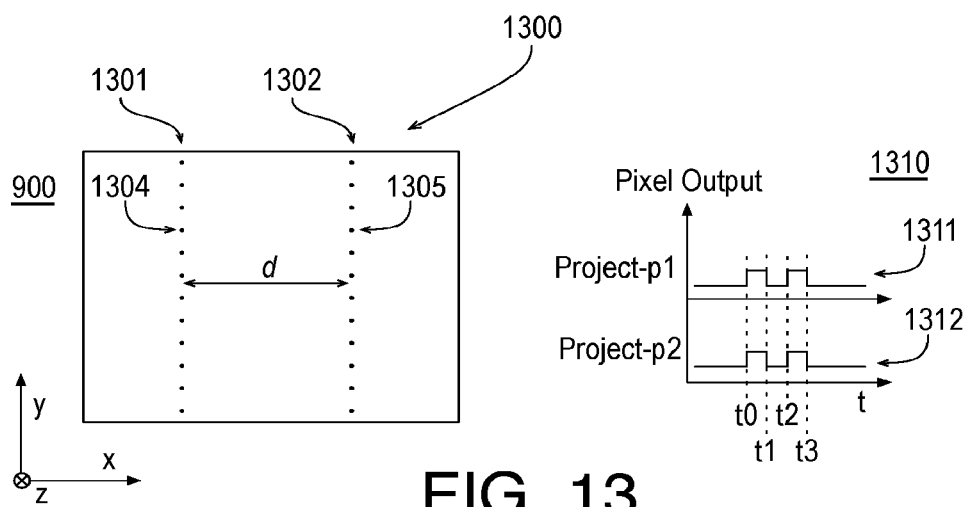
FIG. 13 illustrates yet another example illumination scheme for use in feature matching.

FIG. 13 illustrates yet another example illumination scheme 1300 for use in feature matching, arranged in accordance with at least some implementations of the present disclosure. As shown in FIG. 13, illumination scheme 1300 includes providing, for a first row 1301 of projected features 1304 and a second row 1302 of projected features 1305, the same illumination intensity signals 1311, 1312. Also as shown, projected features 1304 and projected features 1305 are separated by a distance d. For example, matching illumination intensity signals 1311, 1312 may be implemented by each projected feature 1304 of first row 1301 and each projected feature 1305 of first row 1302 so long as projected features 1304 and projected features 1305 are separated by at least a distance d (and pixels of the dynamic projector are separated by a disparity, disp) such that matching illumination intensity signals 1311, 1312 do not hinder feature matching as discussed herein. The distance, d, and/or dynamic projector pixel disparity, disp, may be any suitable values. For example, the pixel disparity may be one-fourth, or one-half of a total pixel disparity of a maximum width (in pixels) of the dynamic projector.

As shown with respect to timing diagram 1310, illumination intensity signals 1311, 1312 match such that both have temporal characteristics including a first on/off illumination and a second on/off illumination. As discussed, the lateral distance between projected features 1304, 1305 implementing illumination intensity signals 1311, 1312 may provide for feature matching as discussed herein. It is noted that such repeating of illumination intensity signals 1311, 1312 may have an associated cost of mistakes in pixel matches with a corresponding benefit of increased speed.

Figure 14:
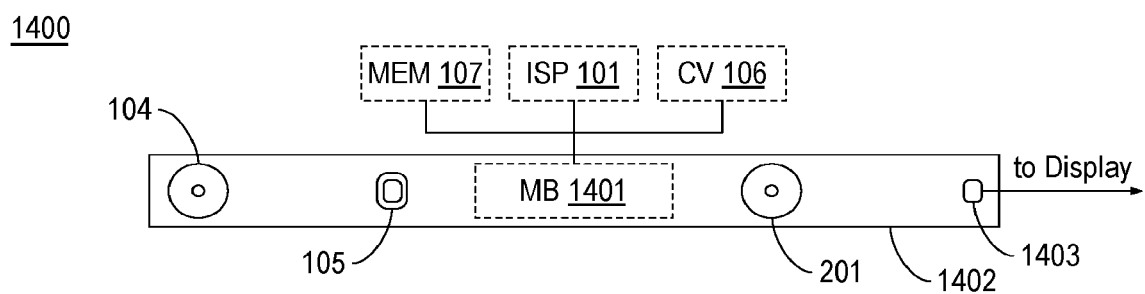
FIG. 14 illustrates an example device for determining correspondence between a dynamic vision sensor and/or between multiple dynamic vision sensors.

FIG. 14 illustrates an example device 1400 for determining correspondence between a dynamic vision sensor and/or between multiple dynamic vision sensors, arranged in accordance with at least some implementations of the present disclosure. As shown in FIG. 14, device 1400 may include dynamic vision camera 104, dynamic vision camera 201, dynamic projector 105, and a motherboard 1401 to implement, within a housing 1402 of device 1400, memory 107, ISP 101, and computer vision module 106. Also as shown, device 1400 may include a display port 1403 to transmit image data for presentment to a user via a display (not shown), which may be implemented as an integrated component of device 1400 or separately from device 1400.

With reference to FIGS. 1 and 2, in some embodiments, feature matching module 102 may be implemented via hardware (e.g., a graphics processor or ISP 101) to generate depth map 113 or a depth image based on feature matching between dynamic vision cameras 104, 201 and/or feature matching between dynamic projector 105 and one or both of dynamic vision cameras 104, 201 using techniques discussed herein. As shown, dynamic vision cameras 104, 201 and, optionally, dynamic projector 105 may be horizontally aligned or substantially horizontally aligned with respect to scene 121 to perform feature matching along a horizontal axis or plane.

Figure 15:
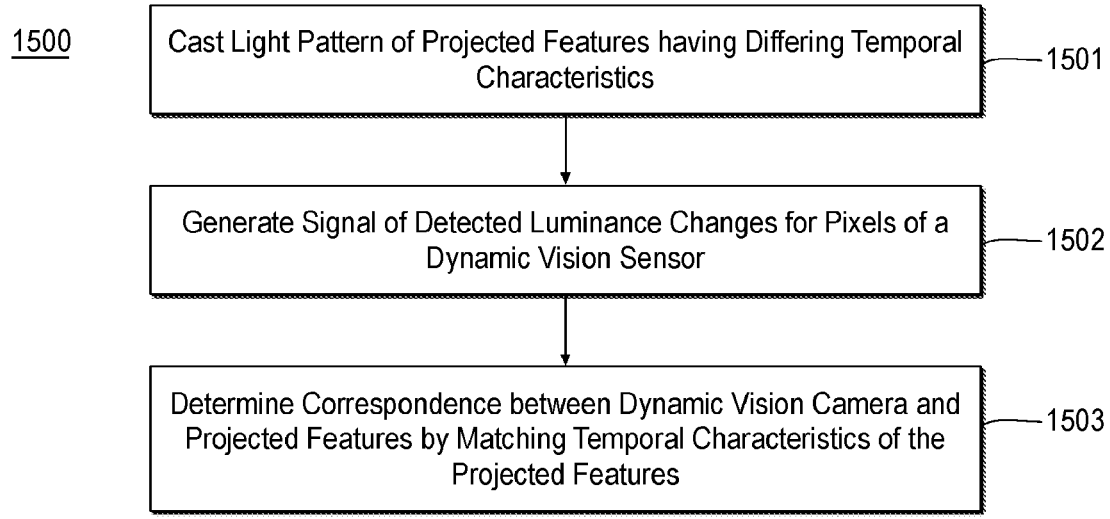
FIG. 15 is a flow diagram illustrating an example process for correlating a feature detected at a dynamic vision sensor pixel to a feature of a projected light pattern.

FIG. 15 is a flow diagram illustrating an example process 1500 for correlating a feature detected at a dynamic vision sensor pixel to a feature of a projected light pattern, arranged in accordance with at least some implementations of the present disclosure. Process 1500 may include one or more operations 1501-1503 as illustrated in FIG. 15. Process 1500 may form at least part of a dynamic vision sensor pixel to projected feature matching process. By way of non-limiting example, process 1500 may be performed by any device, system, or combination thereof as discussed herein. Furthermore, process 1500 will be described herein with reference to system 1600 of FIG. 16, which may perform one or more operations of process 1500.

Figure 16:
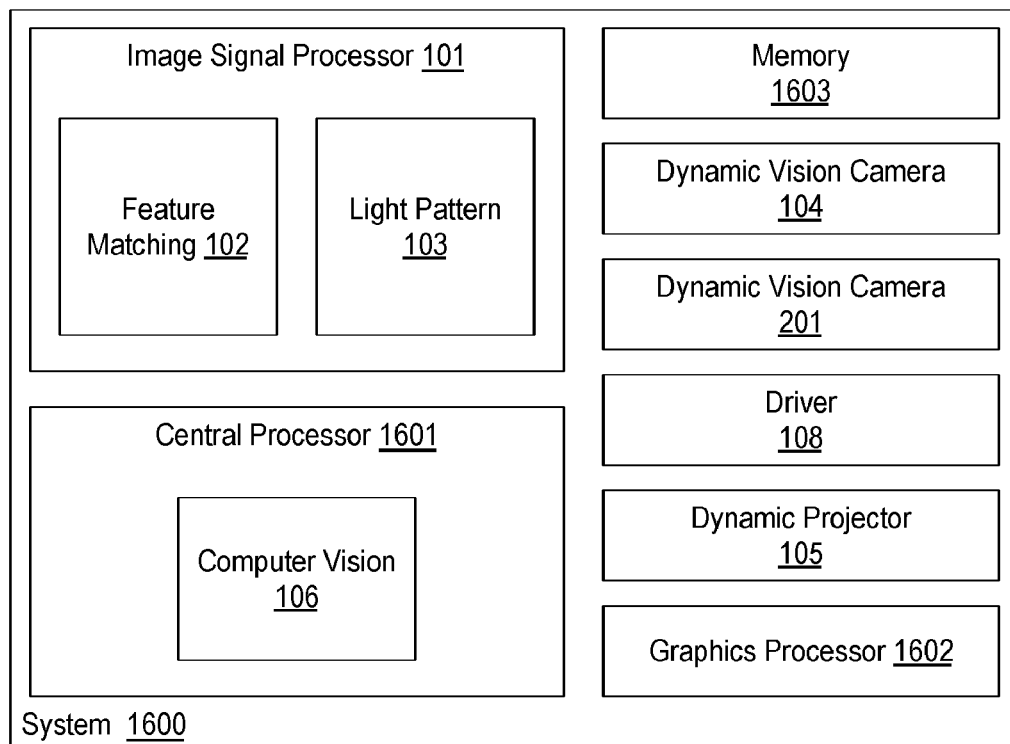
FIG. 16 is an illustrative diagram of an example system for correlating a feature detected at a dynamic vision sensor pixel to a feature of a projected light pattern.

FIG. 16 is an illustrative diagram of an example system 1600 for correlating a feature detected at a dynamic vision sensor pixel to a feature of a projected light pattern, arranged in accordance with at least some implementations of the present disclosure. As shown in FIG. 16, system 1600 may include a central processor 1601, a graphics processor 1602, a memory 1603, dynamic vision cameras 104, 201, dynamic projector 105, driver 108, and ISP 101. Also as shown, central processor 1601 may include or implement computer vision module 106 and ISP 101 may include or implement feature matching module 102 and light pattern module 103. In the example of system 1600, memory 1603 may store pixel signal data, control signal data, depth map data, pixel correspondence data, and/or any other data as discussed herein.

As shown, in some embodiments, computer vision module 106 is implemented by central processor 1601 and feature matching module 102 and light pattern module 103 are implemented by ISP 101. In some embodiments, computer vision module 106 is implemented by ISP 101 or graphics processor 1602. In some embodiments, one or both of feature matching module 102 and light pattern module 103 are implemented by central processor 1601 or graphics processor 1602.

Graphics processor 1602 may include any number and type of graphics processing units that may provide or implement operations discussed herein. For example, graphics processor 1602 may include circuitry dedicated to manipulate pixel signal data or the like obtained from memory 1603. ISP 101 may include any number and type of image signal or image processing units that may provide the discussed feature matching, depth map generation, and computer vision operations and/or other operations as discussed herein. For example, ISP 101 may include circuitry dedicated to pixel signal data and/or light pattern data such as an ASIC or the like. Central processor 1601 may include any number and type of processing units or modules that may provide control and other high level functions for system 1600 and/or provide the discussed feature matching, depth map generation, and computer vision operations and/or other operations as discussed herein. Memory 1603 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1603 may be implemented by cache memory.

In an embodiment, one or more or portions of feature matching module 102, light pattern module 103, and computer vision module 106 may be implemented via an execution unit (EU) of ISP 101 or graphics processor 1602. The EU may include, for example, programmable logic or circuitry such as a logic core or cores that may provide a wide array of programmable logic functions. In an embodiment, one or more or portions of feature matching module 102, light pattern module 103, and computer vision module 106 may be implemented via dedicated hardware such as fixed function circuitry or the like of ISP 101 or graphics processor 1602. Fixed function circuitry may include dedicated logic or circuitry and may provide a set of fixed function entry points that may map to the dedicated logic for a fixed purpose or function.

Returning to discussion of FIG. 15, process 1500 begins at operation 1501, where a light pattern is cast onto a scene such that the light pattern includes multiple projected features having differing temporal characteristics. In an embodiment, dynamic projector 105 casts, onto the scene, the light pattern including multiple projected features such that the projected features have differing temporal characteristics. The differing temporal characteristics may include any temporal characteristics discussed herein such as illumination start time, end time, or duration, a number and/or frequency of illumination events, etc. Furthermore the difference may be any suitable difference such as start time difference, end time difference, duration difference, a number of illumination events difference, frequency difference, etc. The differing temporal characteristics include any number of differing temporal characteristics and/or differing temporal characteristics signatures (e.g., each temporal characteristics signature including multiple temporal characteristics) that differ between any number of projected features. As discussed herein, such projected features correspond to pixel locations of dynamic projector 105 such that pixels provide the discussed differing temporal characteristics between pixels thereof. For example, dynamic projector 105 may be considered a reversed camera that provides projected features from pixels thereof (in comparison to a camera that receives projected features at pixels thereof).

In an embodiment, the light pattern includes a first projected feature or component from a first pixel of dynamic projector 105 and a second projected feature or component from a second pixel of dynamic projector 105 such that the first and second projected feature or component have shared temporal characteristics and the first pixel and the second pixel are orthogonal to an epipolar axis between dynamic projector 105 and dynamic vision sensor 104. In an embodiment, the light pattern includes a first projected feature or component projected at a first angle from dynamic projector 105 and a second projected feature or component projected at a second angle from dynamic projector 105 such that the first and second projected feature or component have shared temporal characteristics and the first and the second angles are orthogonal to the epipolar axis between dynamic projector 105 and dynamic vision sensor 104. For example, the first and second projected feature or component may have the same temporal characteristics (e.g., substantially identical temporal characteristics with differences only between the tolerance capabilities of dynamic projector 105). As discussed, providing shared temporal characteristics orthogonal to the epipolar axis does not hinder pixel matching along the epipolar axis and may instead increase performance as multiple pixel matches are performed simultaneously.

In an embodiment, the light pattern includes a first projected feature or component from a first pixel of dynamic projector 105 and a second projected feature or component from a second pixel of dynamic projector 105 such that the first and second projected features or components have first and second temporal characteristic, respectively, that overlap temporally but differ in at least one of an emission duration, an emission count, or an emission frequency. Due to the difference in temporal characteristics (despite the overlap), the first pixel and the second pixel may have any orientation therebetween. For example, the first pixel and the second pixel may be aligned with an epipolar axis between dynamic projector 105 and dynamic vision sensor 104.

As discussed, dynamic projector 105 may be any suitable dynamic projector having any suitable components such that dynamic projector 105 may cast a light pattern having multiple projected features with differing temporal characteristics. In an embodiment, dynamic projector 105 includes multiple light emitters (e.g., VCSELs) each corresponding to a component of the projected features. In an embodiment, the dynamic projector comprises a plurality of light emitters and one or more optical elements over the light emitters, the one or more optical elements to split light emitted from each of the light emitters into corresponding patterns of projected features. In an embodiment, dynamic projector 105 includes an edge laser and a scanning mirror to cast the light pattern onto the scene. For example, the edge laser and a scanning mirror may work in concert to generate each component of the projected features. Furthermore, dynamic projector 105 may be driven by any suitable circuitry. In an embodiment, projector driver 108 is coupled to dynamic projector 105 and one or more of ISP 101, central processor 1601, and graphics processor 1602 and the projector driver is to provide a signal to dynamic projector 105 and one or more of ISP 101, central processor 1601, and graphics processor 1602 such that the signal is indicative of the light pattern. For example, dynamic projector 105 may use the signal to generate the light pattern and one or more of ISP 101, central processor 1601, and graphics processor 1602 may use the signal for matching purposes.

Processing continues at operation 1502, where a signal may be generated that indicates changes in detected luminance for pixels of dynamic vision sensor 104. In an embodiment, dynamic vision sensor 104 generates a pixel signal indicating changes in detected luminance for pixels of dynamic vision sensor 104. For example, the pixel signal may include identifiers of ON or OFF events, time stamps for such events, a corresponding pixel for such events, and other information as needed. For example, for an individual pixel of dynamic vision sensor 104, the pixel signal may provide an indication only when there is a change in illumination intensity at the individual pixel. In this sense dynamic vision sensor 104 acts as a passive device that detects changes without proactively generating an image frame or the like (as in the case of a traditional sensor). Dynamic vision sensor 104 (and/or dynamic vision sensor 201) may include any suitable components that provide for pixel-by-pixel detection of illumination intensity changes. In an embodiment, a pixel of dynamic vision sensor 104 and/or dynamic vision sensor 201 includes a photoreceptor, a differencing circuit, and a comparator, the differencing circuit and comparator to detect an increase or decrease in photocurrent of the photoreceptor.

Processing continues at operation 1503, where, based on the signal generated at operation 1502, a feature detected by the dynamic vision sensor is determined that corresponds to an individual projected feature of the multiple projected features based on the signal indicating a change in detected luminance corresponding to an individual temporal characteristic of the individual projected feature. In an embodiment, an individual pixel of the dynamic vision sensor that corresponds to an individual projected feature of the light pattern is determined based on the individual pixel having a change in detected luminance corresponding to an individual temporal characteristic of the individual projected feature. For example, a pixel or pixels of dynamic projector 105 may generate a corresponding projected feature having particular or individual temporal characteristics that are unique to the pixel/projected feature. A pixel of dynamic vision sensor 104 senses the projected feature due to being spatially aligned therewith and generates a signal corresponding to the individual temporal characteristics. For example, the pixel signal may include ON and OFF events as discussed herein. The pixel is then correlated to the projected feature based on the match of the temporal characteristics of the pixel signal and the temporal characteristics of the projected feature as discussed herein.

Such a correlation may be used in any suitable application or imaging context. In an embodiment, a depth value for a depth map of the scene is determined based on a location of the individual pixel of dynamic vision sensor 104 and a projected angle of that projected the individual projected feature or component of the light pattern. In an embodiment, a depth value for a depth map of the scene is determined based on the individual pixel of dynamic vision sensor 104 and the dynamic projector pixel of dynamic projector 105 that projected the individual component of the light pattern. Such a depth value may be generated using any suitable technique or techniques such as triangulation techniques. In addition or in the alternative, a second dynamic vision sensor 201 may generate a second signal indicating second changes in detected luminance for second pixels of the second dynamic vision sensor and a second individual pixel of the second dynamic vision sensor 201 corresponding to the individual projected feature of the light pattern may be determined based on the second individual pixel having a second change in detected luminance corresponding to the individual temporal characteristic of the individual projected feature in analogy with operations 1502, 1503 as discussed. A depth value may then be determined based on the location of the individual pixel in dynamic vision sensor 104 and the location of second individual pixel in second dynamic vision sensor 201 using any suitable technique or techniques such as triangulation techniques.

Process 1500 may be repeated any number of times either in series or in parallel for any number pixels or the like. For example, process 1500 may provide for a dynamic vision sensor pixel to projected feature matching process for a plurality of projected features of a light pattern cast onto a scene. In an embodiment, process 1500 further includes generating a depth map or a disparity map based on such pixel matching.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 17:
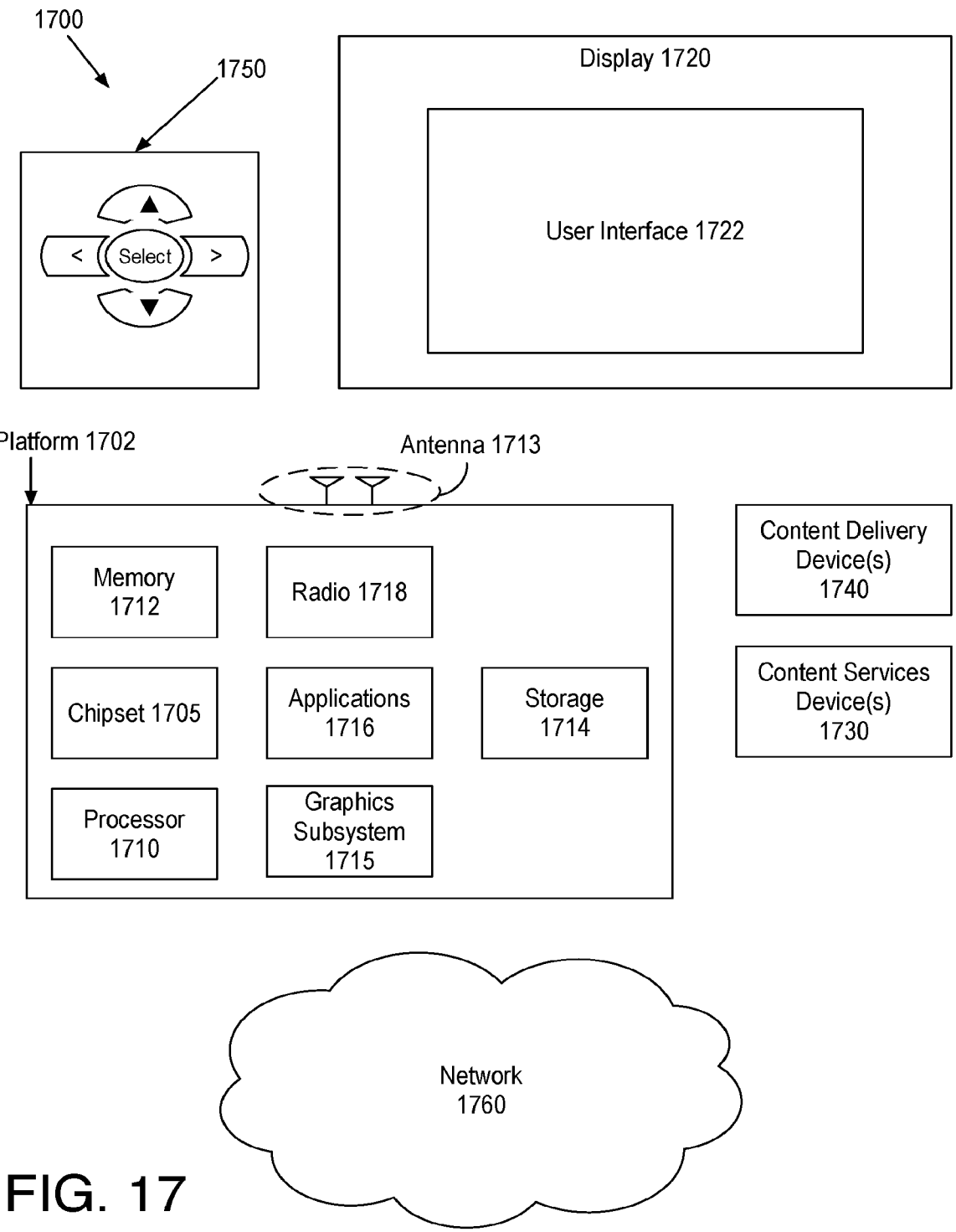
FIG. 17 is an illustrative diagram of an example system.

FIG. 17 is an illustrative diagram of an example system 1700, arranged in accordance with at least some implementations of the present disclosure. In various implementations, system 1700 may be a mobile system although system 1700 is not limited to this context. System 1700 may implement and/or perform any modules or techniques discussed herein. For example, system 1700 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1700 may be implemented via a cloud computing environment.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of uni-directionally or bi-directionally communicating content between content providers and platform 1702 and/display 1720, via network 1760 or directly. It will be appreciated that the content may be communicated uni-directionally and/or bi-directionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of navigation controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In various embodiments, navigation controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
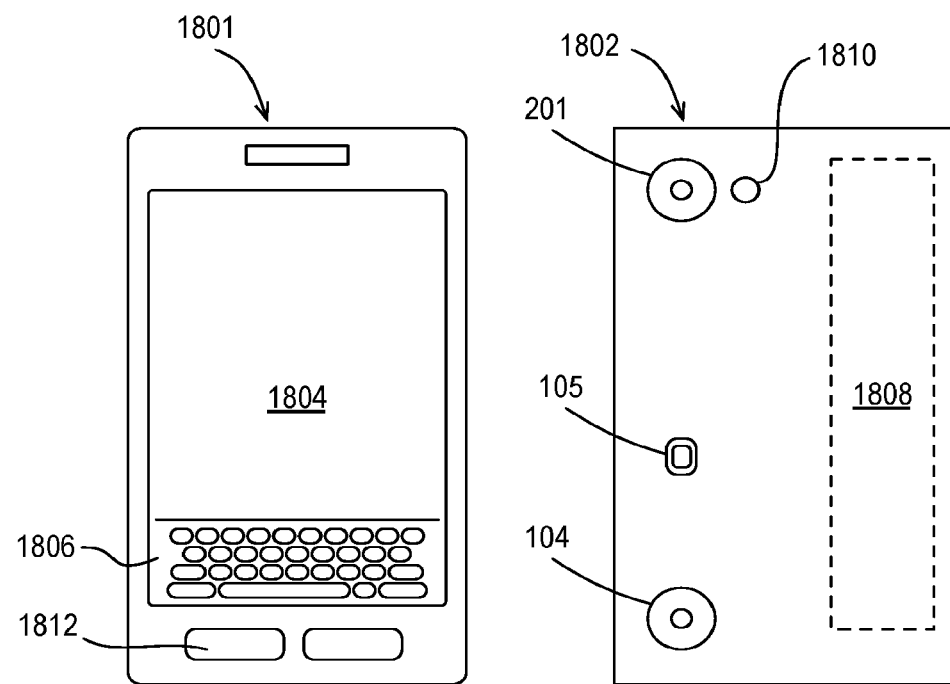
FIG. 18 illustrates an example small form factor device, all arranged in accordance with at least some implementations of the present disclosure.

As described above, system 1700 may be embodied in varying physical styles or form factors. FIG. 18 illustrates an example small form factor device 1800, arranged in accordance with at least some implementations of the present disclosure. In some examples, system 1700 may be implemented via device 1800. In other examples, other systems discussed herein or portions thereof may be implemented via device 1800. In various embodiments, for example, device 1800 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 18, device 1800 may include a housing with a front 1801 and a back 1802. Device 1800 includes a display 1804, an input/output (I/O) device 1806, color camera 104, color camera 105, infrared transmitter 204, and an integrated antenna 1808. Device 1800 also may include navigation features 1812. I/O device 1806 may include any suitable I/O device for entering information into a mobile computing device. Examples for I/O device 1806 may include an alphanumeric keyboard, a numeric keypad, a touch pad, input keys, buttons, switches, microphones, speakers, voice recognition device and software, and so forth. Information also may be entered into device 1800 by way of microphone (not shown), or may be digitized by a voice recognition device. As shown, device 1800 may include color cameras 104, 105 and a flash 1810 integrated into back 1802 (or elsewhere) of device 1800. In other examples, color cameras 104, 105 and flash 1810 may be integrated into front 1801 of device 1800 or both front and back sets of cameras may be provided. Color cameras 104, 105 and a flash 1810 may be components of a camera module to originate color image data with IR texture correction that may be processed into an image or streaming video that is output to display 1804 and/or communicated remotely from device 1800 via antenna 1808 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a dynamic projector to cast, onto a scene, a light pattern comprising multiple projected features, the projected features comprising differing temporal characteristics, a dynamic vision sensor to generate a signal indicating changes in detected luminance for pixels of the dynamic vision sensor, and a processor coupled to the dynamic vision sensor, the processor to receive the signal and to determine a feature detected by the dynamic vision sensor corresponds to an individual projected feature of the multiple projected features based on the signal indicating a change in detected luminance corresponding to an individual temporal characteristic of the individual projected feature.

In one or more second embodiments, further to the first embodiments, the processor is further to identify at least one pixel of the dynamic vision sensor corresponding to the feature detected by the dynamic vision sensor.

In one or more third embodiments, further to any of the first or second embodiments, the processor is further to determine a depth value for a depth map of the scene based on a location of the at least one pixel in the dynamic vision sensor and a projected angle corresponding to the individual projected feature of the light pattern.

In one or more fourth embodiments, further to any of the first through third embodiments, the device further comprises a second dynamic vision sensor to generate a second signal indicating second changes in detected luminance for second pixels of the second dynamic vision sensor, wherein the processor is further to determine a second feature detected by the second dynamic vision sensor corresponds to the individual projected feature based on the second signal indicating a second change in detected luminance corresponding to the individual temporal characteristic of the individual projected feature.

In one or more fifth embodiments, further to any of the first through fourth embodiments, the processor is further to determine a depth value for a depth map of the scene based on a location of a pixel of the dynamic vision sensor corresponding to the feature detected by the dynamic vision sensor and a location of a pixel of the second dynamic vision sensor corresponding to the second feature detected by the second dynamic vision sensor.

In one or more sixth embodiments, further to any of the first through fifth embodiments, the dynamic projector, the dynamic vision sensor, and the second dynamic vision sensor are configured in a triangular shape such that the dynamic projector is off-axis and orthogonal to an axis between the dynamic vision sensor and the second dynamic vision sensor.

In one or more seventh embodiments, further to any of the first through sixth embodiments, the light pattern comprises a first projected feature from a first pixel of the dynamic projector and a second projected feature from a second pixel of the dynamic projector, the first and second projected features having shared temporal characteristics, wherein the first pixel and the second pixel are orthogonal to an epipolar axis between the dynamic projector and the dynamic vision sensor.

In one or more eighth embodiments, further to any of the first through seventh embodiments, the light pattern comprises a first projected feature from a first pixel of the dynamic projector and a second projected feature from a second pixel of the dynamic projector, the first and second projected features having first and second temporal characteristics, respectively, wherein the first and second temporal characteristic overlap temporally but differ in at least one of an emission duration, an emission count, or an emission frequency.

In one or more ninth embodiments, further to any of the first through eighth embodiments, the dynamic projector comprises a plurality of light emitters each corresponding to a projected feature of the projected features.

In one or more tenth embodiments, further to any of the first through ninth embodiments, the dynamic projector comprises a plurality of light emitters and one or more optical elements over the light emitters, the one or more optical elements to split light emitted from each of the light emitters into corresponding patterns of projected features.

In one or more eleventh embodiments, further to any of the first through tenth embodiments, the dynamic projector comprises an edge laser and a scanning mirror to cast the light pattern onto the scene.

In one or more twelfth embodiments, further to any of the first through eleventh embodiments, a pixel of the dynamic vision sensor comprises a photoreceptor, a differencing circuit, and a comparator, the differencing circuit and comparator to detect an increase or decrease in photocurrent of the photoreceptor.

In one or more thirteenth embodiments, further to any of the first through twelfth embodiments, the device further comprises a projector driver coupled to the dynamic projector and the processor, the projector driver to provide a signal to the dynamic projector and the processor, the signal indicative of the light pattern.

In one or more fourteenth embodiments, a method comprises casting, onto a scene, a light pattern comprising multiple projected features, the projected features comprising differing temporal characteristics, generating a signal indicating changes in detected luminance for pixels of a dynamic vision sensor, and determining, based on the signal, a set of pixels of the dynamic vision sensor corresponding to an individual projected feature of the multiple projected features based on the set of pixels having a change in detected luminance corresponding to an individual temporal characteristic of the individual projected feature.

In one or more fifteenth embodiments, further to the fourteenth embodiments, the method further comprises determining a depth value for a depth map of the scene based on pixel locations of the set of pixels corresponding to the individual projected feature and a projected angle corresponding to the individual projected feature of the light pattern.

In one or more sixteenth embodiments, further to any of the fourteenth or fifteenth embodiments, the method further comprises generating a second signal indicating second changes in detected luminance for second pixels of the second dynamic vision sensor and determining a second set of pixels of the second dynamic vision sensor corresponding to the individual projected feature based on the second set of pixels having a second change in detected luminance corresponding to the individual temporal characteristic of the individual projected feature.

In one or more seventeenth embodiments, further to any of the fourteenth through sixteenth embodiments, the method further comprises determining a depth value for a depth map of the scene based on pixel locations of the set of pixels in the dynamic vision sensor and second pixel locations of the second set of pixels in the second dynamic vision sensor.

In one or more eighteenth embodiments, further to any of the fourteenth through sixteenth embodiments, the light pattern comprises a first projected feature from a first angle of the dynamic projector and a second projected feature from a second angle of the dynamic projector, the first and second projected features having shared temporal characteristics, wherein the first angle and the second angle are orthogonal to an epipolar axis between the dynamic projector and the dynamic vision sensor.

In one or more nineteenth embodiments, further to any of the fourteenth through eighteenth embodiments, the light pattern comprises a first projected feature from a first angle of the dynamic projector and a second projected feature from a second angle of the dynamic projector, the first and second projected features having first and second temporal characteristics, respectively, wherein the first and second temporal characteristics overlap temporally but differ in at least one of an emission duration, an emission count, or an emission frequency.

In one or more twentieth embodiments, at least one machine readable medium may include a plurality of instructions that in response to being executed on a computing device, causes the computing device to perform a method according to any one of the above embodiments.

In one or more twenty-first embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device comprising:
   a dynamic projector including a VCSEL array, the dynamic projector is configured to cast a light pattern comprising first projected features and second projected features, the first projected features including first temporal characteristics, the second projected features including second temporal characteristics that are different from the first temporal characteristics;
   a dynamic vision sensor comprising a plurality of sensor pixels including a first sensor pixel and a second sensor pixel, the first sensor pixel and second sensor pixels respectively comprising a photoreceptor, a differencing circuit, and a comparator,
   the first sensor pixel configured to output a first sensor pixel signal comprising at least one of a photocurrent increase event or a photocurrent decrease event for incident light detected by the first sensor pixel, and
   the second sensor pixel configured to output a second sensor pixel signal comprising at least one of the photocurrent increase event or the photocurrent decrease event for incident light detected by the second sensor pixel; and
   one or more processors coupled to the dynamic vision sensor, the one or more processors configured to receive the first and second sensor pixel signals and to determine whether the first and second sensor pixels correspond to the first or second projected features, respectively, based on whether the first and second sensor pixel signals comprise the photocurrent increase or the photocurrent decrease events.

2. The device of claim 1, wherein the VCSEL array includes a first emitting region and a second emitting region.

3. The device of claim 2, wherein the processor is configured to drive the first emitting region and the second emitting region independently.

4. The device of claim 2, wherein the first emitting region is different than the second emitting region.

5. A device comprising:
a dynamic projector including a first emitting region of a VCSEL array and a second emitting region of the VCSEL array,
wherein the first emitting region and the second emitting region emit light independently;
a first dynamic vision sensor including a plurality of pixels, wherein at least one of the plurality of pixels includes a photo receptor, a differencing circuit and a comparator, and wherein the first dynamic vision sensor is configured to output an event signal; and
a processor coupled to the dynamic projector and the first dynamic vision sensor, wherein the processor is configured to output a depth information based on the event signal.

6. The device of claim 5, wherein
the first emitting region is configured to emit light for a first emission duration, and
the second emitting region is configured to emit light for a second emission duration different from the first emission duration.

7. The device of claim 5, wherein the processor is configured to drive the first emitting region and the second emitting region independently.

8. The device of claim 5, wherein the first emitting region is different than the second emitting region.

9. The device of claim 5, wherein the photoreceptor is configured to detect an incident light and to generate a photo-current.

10. The device of claim 9, wherein the differencing circuit is configured to detect increase or decrease of the photo-current.

11. The device of claim 10, wherein the comparator is configured to compare a reference signal and an output from the differencing circuit.

12. The device of claim 5, wherein
the first emitting region includes first temporal characteristics, and
the second emitting region includes second temporal characteristics different than the first temporal characteristics.

13. The device of claim 5, further comprising:
a second dynamic vision sensor coupled to the processor.

14. The device of claim 13, wherein the dynamic projector is disposed between the first dynamic vision sensor and the second dynamic vision sensor.

15. A smart phone comprising:
a dynamic projector including a first emitting region of a VCSEL array and a second emitting region of the VCSEL array,
wherein the first emitting region and the second emitting region emit light independently;
a dynamic vision sensor including a plurality of pixels, wherein at least one of the plurality of pixels includes a photo receptor, a differencing circuit and a comparator, and wherein the dynamic vision sensor is configured to output an event signal;
a processor coupled to the dynamic projector and the dynamic vision sensor, wherein the processor is configured to output a depth information based on the event signal; and
a color camera.

16. The smart phone of claim 15, wherein the dynamic vision sensor and the color camera are disposed at a back of the smart phone.

17. The smart phone of claim 15, further comprising:
a flash is disposed adjacent to the color camera.

18. The smart phone of claim 15, wherein the photoreceptor is configured to detect an incident light and to generate a photo-current.

19. The smart phone of claim 18, wherein the differencing circuit is configured to detect increase or decrease of the photo-current.

20. The smart phone of claim 19, wherein the comparator is configured to compare a reference signal and an output from the differencing circuit.

* * * * *